United States Patent [19]

Maloney

[11] 4,349,422

[45] Sep. 14, 1982

[54] ELECTROLYSIS PROCESS

[75] Inventor: Daniel E. Maloney, Hockessin, Del.

[73] Assignee: E. I. Du Pont de Nemours and Company, Wilmington, Del.

[21] Appl. No.: 225,639

[22] Filed: Jan. 16, 1981

[51] Int. Cl.³ .................... C25B 1/34; C25B 13/02; C25B 13/08

[52] U.S. Cl. .................... 204/98; 204/128; 204/296

[58] Field of Search .................... 204/98, 128, 296

[56] References Cited

U.S. PATENT DOCUMENTS

| | | | |
|---|---|---|---|
| 3,356,607 | 12/1967 | Eisenmann et al. | 204/296 |
| 4,021,327 | 5/1977 | Grot | 204/296 |
| 4,123,336 | 10/1978 | Seko et al. | 204/296 |

FOREIGN PATENT DOCUMENTS

| | | |
|---|---|---|
| 53-56192 | 5/1978 | Japan . |
| 55-110786 | 8/1980 | Japan . |
| 2043108 | 10/1980 | United Kingdom . |

*Primary Examiner*—R. L. Andrews

[57] ABSTRACT

A process and cell for electrolysis of alkali metal halides, especially sodium chloride, are described, wherein the anolyte and catholyte compartments are separated by a fluorinated ion-exchange membrane whose surface facing the catholyte compartment is of a polymer having carboxylic functionality and which has a roughness which does not exceed 1.5 microns. Such a cell and process operate at high current efficiency, low voltage and low power consumption.

10 Claims, No Drawings

ELECTROLYSIS PROCESS

BACKGROUND OF THE INVENTION

Fluorinated ion exchange polymers having carboxylic acid and/or sulfonic acid functional groups or salts thereof are known in the art. One principal use of such polymers is as a component of a membrane used to separate the anode and cathode compartments of a chloralkali electrolysis cell. Such membrane can be in the form of a reinforced or unreinforced film or laminar structure.

It is desirable for use in a chloroalkali cell that a membrane provides for operation at low voltage and high current efficiency, and thereby at low power consumption, so as to provide products of high purity at low cost, especially in view of today's steadily increasing cost of energy.

At present, the effect of the surface characteristics of a membrane on its performance during use in electrochemical cell processes is little understood.

It is a principal object of this invention to provide for improved operation of electrochemical cells, more specifically, electrolysis cells such as a chloralkali cell, at high current efficiency and low voltage, and thereby at low power consumption. A more specific object is to modify or adjust the surface character of a membrane which separates the electrode compartments of such cells, so as to improve such cells and their operations. Other objects will become apparent hereinbelow.

SUMMARY OF THE INVENTION

Briefly, according to the invention, there is provided an electrolysis process and cell wherein the ion-exchange membrane which is employed has at least a layer of a fluorinated polymer having carboxylic functional groups, wherein said membrane is positioned so that there is an exposed surface of said carboxylic polymer facing toward the cathode of the cell, and wherein the indicated surface facing the cathode has a relatively smooth surface as set forth more specifically hereinbelow. As will be explained more fully hereinbelow, the terms "smooth", "rough", etc. as employed herein refer to the surface character of the membrane on a scale smaller than any surface contours which are associated with any web of support material which may be embedded in the membrane.

More specifically, in one aspect of the invention there is provided a process for electrolysis of an alkali metal chloride in an electrolytic cell divided by a cation-exchange membrane into an anode compartment and a cathode compartment in which an alkali metal hydroxide is produced, said membrane comprising at least a first layer, said first layer being of a first fluorinated polymer having carboxylic functional groups in ion-exchange form, said first layer having a first exposed surface which has a roughness which does not exceed 1.5 microns (60 microinches) and being disposed so that said first exposed surface faces toward said cathode compartment.

In another aspect of the invention there is provided an electrochemical cell which comprises an anode compartment, an anode situated within said anode compartment, a cathode compartment, a cathode situated within said cathode compartment, and, separating said compartments, a cation-exchange membrane which comprises at least a first layer, said first layer being of a first fluorinated polymer having carboxylic functional groups in ion-exchange form, said first layer having a first exposed surface which has a roughness which does not exceed 1.5 microns (60 microinches) and being disposed so that said first exposed surface faces toward said cathode compartment.

DETAILED DESCRIPTION OF THE INVENTION

The membranes used in the present invention are typically prepared from one or more layers of fluorinated polymer which have —COOR and/or —SO$_2$W functional groups, where R is lower alkyl and W is F or Cl, and a web of support material.

The first layer of polymer with which the present invention is concerned is typically a carboxylic polymer having a fluorinated hydrocarbon backbone chain to which are attached the functional groups or pendant side chains which in turn carry the functional groups. The pendant side chains can contain, for example

groups wherein Z is F or CF$_3$, t is 1 to 12, and V is —COOR or —CN, where R is lower alkyl. Ordinarily, the functional group in the side chains of the polymer will be present in terminal

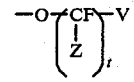

groups. Examples of fluorinated polymers of this kind are disclosed in British Pat. No. 1,145,445, U.S. Pat. Nos. 4,116,888, and 3,506,635. More specifically, the polymers can be prepared from monomers which are fluorinated or fluorine-substituted vinyl compounds. The polymers are usually made from at least two monomers. At least one monomer is a fluorinated vinyl compound such as vinyl fluoride, hexafluoropropylene, vinylidene fluoride, trifluoroethylene, chlorotrifluoroethylene, perfluoro(alkyl vinyl ether), tetrafluoroethylene and mixtures thereof. In the case of copolymers which will be used in electrolysis of brine, the precursor vinyl monomer desirably will not contain hydrogen. Additionally, at least one monomer is a fluorinated monomer which contains a group which can be hydrolyzed to a carboxylic acid group, e.g., a carboalkoxy or nitrile group, in a side chain as set forth above.

By "fluorinated polymer" is meant a polymer in which, after loss of the R group by hydrolysis to ion exchange form, the number of F atoms is at least 90% of the number of F atoms and H atoms.

The monomers, with the exception of the R group in the —COOR, will preferably not contain hydrogen, especially if the polymer will be used in the electrolysis of brine, and for greatest stability in harsh environments, most preferably will be free of both hydrogen and chlorine, i.e., will be perfluorinated; the R group need not be fluorinated as it is lost during hydrolysis when the functional groups are converted to ion exchange groups.

One exemplary suitable type of carboxyl-containing monomer is represented by the formula

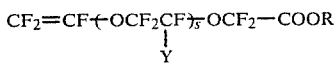

wherein
R is lower alkyl,
Y is F or CF$_3$, and
s is 0, 1 or 2.

Those monomers wherein s is 1 are preferred because their preparation and isolation in good yield is more easily accomplished than when s is 0 or 2. The compound

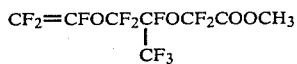

is an especially useful monomer. Such monomers can be prepared, for example, from compounds having the formula

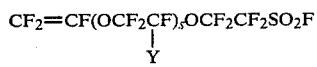

wherein s and Y are as defined above, by (1) saturating the terminal vinyl group with chlorine to protect it in subsequent steps by converting it to a CF$_2$Cl—CFCl— group; (2) oxidation with nitrogen dioxide to convert the —OCF$_2$CF$_2$SO$_2$F group to an —OCF$_2$COF group; (3) esterification with an alcohol such as methanol to form an —OCF$_2$COOCH$_3$ group; and (4) dechlorination with zinc dust to regenerate the terminal CF$_2$=CF— group. It is also possible to replace steps (2) and (3) of this sequence by the steps (a) reduction of the —OCF$_2$CF$_2$SO$_2$F group to a sulfinic acid, —OCF$_2$CF$_2$SO$_2$H, or alkali metal or alkaline earth metal salt thereof by treatment with a sulfite salt or hydrazine; (b) oxidation of the sulfinic acid or salt thereof with oxygen or chromic acid, whereby —OCF$_2$COOH groups or metal salts thereof are formed; and (c) esterification to —OCF$_2$COOCH$_3$ by known methods; this sequence is more fully described in South African Patent No. 78/2224. Preparation of copolymers thereof is described in South African Patent No. 78/2221.

Another exemplary suitable type of carboxyl-containing monomer is represented by the formula

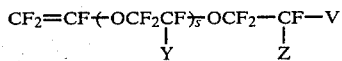

wherein
V is —COOR or —CN,
R is lower alkyl,
Y is F or CF$_3$,
Z is F or CF$_3$, and
s is 0, 1 or 2.

The most preferred monomers are those wherein V is —COOR wherein R is lower alkyl, generally C$_1$ to C$_5$, because of ease in polymerization and conversion to ionic form. Those monomers wherein s is 1 are also preferred because their preparation and isolation in good yield is more easily accomplished than when s is 0 or 2. Preparation of those monomers wherein V is —COOR where R is lower alkyl, and copolymers thereof, is described in U.S. Pat. No. 4,131,740. The compounds

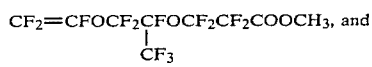

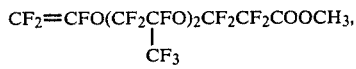

whose preparation is described therein, are especially useful monomers. Preparation of monomers wherein V is —CN is described in U.S. Pat. No. 3,852,326.

Yet another suitable type of carboxyl-containing monomer is that having a terminal —O(CF$_2$)$_v$COOCH$_3$ group where v is from 2 to 12, such as CF$_2$=CF—O(CF$_2$)$_3$COOCH$_3$ and CF$_2$=CFOCF$_2$CF(CF$_3$)O(CF$_2$)$_3$COOCH$_3$. Preparation of such monomers and copolymers thereof is described in Japanese Patent Publications Nos. 38486/77 and 28586/77, and in British Pat. No. 1,145,445.

Another class of carboxyl-containing polymers is represented by polymers having the repeating units

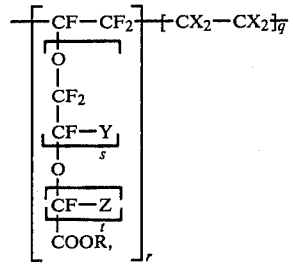

wherein
q is 3 to 15,
r is 1 to 10,
s is 0, 1 or 2,
t is 1 to 12,
the X's taken together are four fluorines or three fluorines and one chlorine,
Y is F or CF$_3$,
Z is F or CF$_3$, and
R is lower alkyl.

A preferred group of copolymers are those of tetrafluoroethylene and a compound having the formula

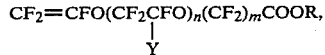

where
n is 0, 1 or 2,
m is 1, 2, 3 or 4,
Y is F or CF$_3$, and
R is CH$_3$, C$_2$H$_5$ or C$_3$H$_7$.

Such copolymers with which the present invention is concerned can be prepared by techniques known in the art, e.g., U.S. Pat. No. 3,528,954, U.S. Pat. No. 4,131,740, and South African Pat. No. 78/2225.

When a layer of sulfonyl polymer is present, it is typically a polymer having a fluorinated hydrocarbon backbone chain to which are attached the functional groups or pendant side chains which in turn carry the functional groups. The pendant side chains can contain, for example,

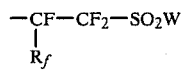

groups wherein $R_f$ is F, Cl, or a $C_1$ to $C_{10}$ perfluoroalkyl radical, and W is F or Cl, preferably F. Ordinarily, the functional group in the side chains of the polymer will be present in terminal

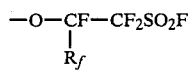

groups. Examples of fluorinated polymers of this kind are disclosed in U.S. Pat. No. 3,282,875, U.S. Pat. No. 3,560,568 and U.S. Pat. No. 3,718,627. More specifically, the polymers can be prepared from monomers which are fluorinated or fluorine substituted vinyl compounds. The polymers are made from at least two monomers, with at least one of the monomers coming from each of the two groups described below.

At least one monomer is a fluorinated vinyl compound such as vinyl fluoride, hexafluoropropylene, vinylidene fluoride, trifluoroethylene, chlorotrifluoroethylene, perfluoro(alkyl vinyl ether), tetrafluoroethylene and mixtures thereof. In the case of copolymers which will be used in electrolysis of brine, the precursor vinyl monomer desirably will not contain hydrogen.

The second group is the sulfonyl-containing monomers containing the precursor group

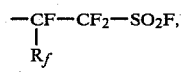

wherein $R_f$ is as defined above. Additional examples can be represented by the general formula $CF_2=CF-T-_k-CF_2SO_2F$ wherein T is a bifunctional fluorinated radical comprising 1 to 8 carbon atoms, and k is 0 or 1. Substituent atoms in T include fluorine, chlorine, or hydrogen, although generally hydrogen will be excluded in use of the copolymer for ion exchange in a chloralkali cell. The most preferred polymers are free of both hydrogen and chlorine attached to carbon, i.e., they are perfluorinated, for greatest stability in harsh environments. The T radical of the formula above can be either branched or unbranched, i.e., straight-chain, and can have one or more ether linkages. It is preferred that the vinyl radical in this group of sulfonyl fluoride containing comonomers be joined to the T group through an ether linkage, i.e., that the comonomer be of the formula $CF_2=CF-O-T-CF_2-SO_2F$. Illustrative of such sulfonyl fluoride containing comonomers are $CF_2=CFOCF_2CF_2SO_2F$,

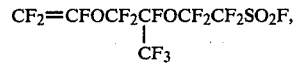

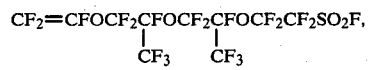

$CF_2=CFCF_2CF_2SO_2F$, and

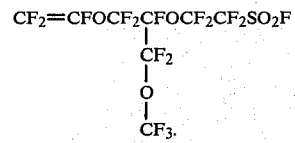

The most preferred sulfonyl fluoride containing comonomer is perfluoro(3,6-dioxa-4-methyl-7-octenesulfonyl fluoride),

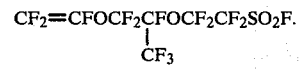

The sulfonyl-containing monomers are disclosed in such references as U.S. Pat. No. 3,282,875, U.S. Pat. No. 3,041,317, U.S. Pat. No. 3,718,627 and U.S. Pat. No. 3,560,568.

A preferred class of such polymers is represented by polymers having the repeating units

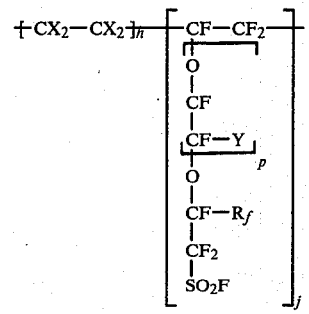

wherein
h is 3 to 15,
j is 1 to 10,
p is 0, 1 or 2,
the X's taken together are four fluorines or three fluorines and one chlorine,
Y is F or $CF_3$, and
$R_f$ is F, Cl or a $C_1$ to $C_{10}$ perfluoroalkyl radical.

A most preferred copolymer is a copolymer of tetrafluoroethylene and perfluoro(3,6-dioxa-4-methyl-7-octenesulfonyl fluoride) which comprises 20 to 65 percent, preferably, 25 to 50 percent by weight of the latter.

Such copolymers used in the present invention can be prepared by general polymerization techniques developed for homo- and copolymerizations of fluorinated ethylenes, particularly those employed for tetrafluoroethylene which are described in the literature. Nonaqueous techniques for preparing the copolymers include that of U.S. Pat. No. 3,041,317, that is, by the polymerization of a mixture of the major monomer therein, such as tetrafluoroethylene, and a fluorinated ethylene containing a sulfonyl fluoride group in the presence of a free radical initiator, preferably a perfluorocarbon peroxide or azo compound, at a temperature in the range 0°–200° C. and at pressures in the range of $10^5$ to $2 \times 10^7$ pascals (1–200 Atm.) or higher. The nonaqueous polymerization may, if desired, be carried out in the presence of a fluorinated solvent. Suitable fluorinated solvents are inert, liquid, perfluorinated hydrocarbons, such as perfluoromethylcyclohexane, perfluorodimethylcyclobutane, perfluorooctane, perfluorobenzene and the like, and inert, liquid chlorofluorocarbons such as 1,1,2-trichloro-1,2-2-trifluoroethane, and the like.

Aqueous techniques for preparing the copolymer include contacting the monomers with an aqueous medium containing a free-radical initiator to obtain a slurry of polymer particles in non-water-wet or granular form, as disclosed in U.S. Pat. No. 2,393,967, or contacting the monomers with an aqueous medium containing both a free-radical initiator and a telogenically inactive dispersing agent, to obtain an aqueous colloidal dispersion of polymer particles, and coagulating the dispersion, as disclosed, for example, in U.S. Pat. No. 2,559,752 and U.S. Pat. No. 2,593,583.

A copolymer which contains different types of functional groups can also be used as a component film in making the membrane employed in the invention. For example, a terpolymer prepared from a monomer chosen from the group of nonfunctional monomers described above, a monomer from the group of carboxylic monomers described above, and additionally a monomer from the group of sulfonyl monomers described above, can be prepared and used as one of the film components in making the membrane.

It is further possible to use as a component film of the membrane a film which is a blend of two or more polymers. For example, a blend of a polymer having sulfonyl groups in melt-fabricable form with a polymer having carboxyl groups in melt-fabricable form can be prepared and used as one of the component films of the membrane.

It is additionally possible to use a laminar film as one of the component films in making the membrane. For example, a film having a layer of a copolymer having sulfonyl groups in melt-fabricable form and a layer of a copolymer having carboxyl groups in melt-fabricable form, can also be used as one of the component films in making the membrane.

An essential component of the membrane used in the process and cell of the invention is a layer of a first fluorinated polymer which has carboxylic functional groups in ion exchange form, e.g., —COONa or —COOK groups, which has an equivalent weight in the range of 400 to 2000, most preferably 1000 to 1100, and which has a thickness in the range of 13 to 250 microns (0.5 to 10 mils), preferably 25 to 75 microns (1 to 3 mils).

The membrane used in the invention may or may not have, in adherent contact with said layer of first fluorinated polymer, an optional component which is a layer of a second fluorinated polymer which has sulfonyl functional groups in ion exchange form, e.g., —SO$_3$Na or —SO$_3$K groups, which has an equivalent weight in the range of 800 to 2000, most preferably 1100 to 1200, and which has a thickness in the range of 13 to 150 microns (0.5 to 6 mils), preferably 13 to 75 microns (0.5 to 3 mils). When this second layer is present, the thickness of the first layer of first fluorinated polymer should be 13 to 150 microns, preferably 13 to 75 microns, and the thickness of the first and second layers taken together should be in the range of 26 to 250 microns (1 to 10 mils), preferably 26 to 150 microns (1 to 6 mils).

Concerning both the polymer with carboxyl functionality and the polymer with sulfonyl functionality, above an equivalent weight of 2000, the electrical resistivity becomes too high, and below the indicated lower equivalent weight limits, the mechanical properties are poor because of excessive swelling of the polymer. The relative amounts of the comonomers which make up the polymer can be adjusted or chosen such that the polymer has a desired equivalent weight. The equivalent weight above which the resistance of a film or membrane becomes too high for practical use in an electrolytic cell varies somewhat with the thickness of the film or membrane. For thinner films and membranes, equivalent weights up to about 2000 can be tolerated. For most purposes, however, and for films of ordinary thickness, a value no greater than about 1400 is preferred.

Optionally, the membrane used in the present invention may have embedded therein a web of support material.

Such web can be, for example, a woven or knitted reinforcement fabric.

In the case of woven fabric, weaves such as ordinary basketweave and leno weave are suitable. The threads of the fabric can be either monofilament or multistranded.

The threads are perhalocarbon polymer threads. As employed herein, the term "perhalocarbon polymer" is employed to refer to a polymer which has a carbon chain which may or may not contain ether oxygen linkages therein and which is totally substituted by fluorine or by fluorine and chlorine atoms. Preferably the perhalocarbon polymer is a perfluorocarbon polymer, as it has greater chemical inertness. Typical such polymers include homopolymers made from tetrafluoroethylene and copolymers of tetrafluoroethylene with hexafluoropropylene and/or perfluoro(alkyl vinyl ethers) with alkyl being 1 to 10 carbon atoms such as perfluoro(propyl vinyl ether). An example of a most preferred thread material is polytetrafluoroethylene. Threads made from chlorotrifluoroethylene polymers are also useful.

So as to have adequate strength in the fabric before lamination, and in the membrane after lamination, the threads should be of 50 to 600 denier, preferably 200 to 400 denier (denier is g/9000 m of thread).

The fabric will typically have a thread count in the range of 1.6 to 16 threads/cm (4 to 40 threads/inch) in each of the warp and weft, preferably 3 to 10 threads/cm.

Such fabric can also have incorporated therein sacrificial threads.

The sacrificial members of the fabric are threads of any of a number of suitable substances, either natural or synthetic. Suitable substances include cotton, linen, silk, rayon, cellulose acetate, nitrocellulose, nylon, polyvinyl alcohol, polyesters, polyacrylonitriles and polyolefins. The cellulosic substances are preferred. The primary requirement of the sacrificial fibers is their removal without a detrimental effect on the polymer matrix. With this proviso, the chemical makeup of the sacrificial fibers is not critical. In similar fashion the manner of removal of the sacrificial fibers is not critical as long as this removal does not interfere with the ion exchange capability of the final polymer in the cation permeable separator. For purposes of illustration, removal of sacrificial fibers of a cellulosic material such as rayon may be done with sodium hydrochlorite. The sacrificial fibers are fibers which can be removed without a detrimental effect on either an intermediate polymer which is a precursor to a polymer possessing ion exchange sites or a polymer with ion exchange sites. The sacrificial fibers are removed from either polymer leaving voids without interfering with the ion exchange capability of the final polymer. The manner of removal of the sacrificial fibers should not affect the supporting fibers employed to reinforce the separator.

The sacrificial members, e.g., rayon threads, can suitably be of about 40 to 100 denier.

The web of support material can also be a sheet of microporous polytetrafluoroethylene, or a nonwoven paper sheet made of perhalocarbon fibers and optionally other fibers such as cellulosic fibers.

When the membrane consists of layers of both carboxylic and sulfonyl polymers, the web of support material can be disposed in either polymer, or at the boundary of the layers. For a membrane intended for use in a chloroalkali electrolysis process, the web of support material will preferably be at least predominantly, and most preferably entirely, in a layer of sulfonyl polymer, and the membrane will be employed with the carboxyl surface of the membrane facing the cathode of the cell.

In accordance with the invention, the essential layer of the membrane, which is a layer of fluorinated polymer having carboxylic functionality, has an exposed surface which has a roughness which does not exceed 1.5 microns (60 microinches), said surface facing toward the cathode of the cell. Preferably the roughness of this surface is in the range of 0.4 to 1.3 microns (15 to 50 microinches).

When employed in reference to a membrane having a web of support material, such as a fabric, embedded therein, the terms "roughness", "rough", "smoothness" and "smooth" are used to refer to the character of the membrane surface which is distinct and separate from surface contours associated with the strands of the support material. The threads or other members of the support material generally cause contours to form on the surface of a membrane during fabrication of the membrane, but it is not these contours to which the term "roughness" refers. The contours are of larger scale than the character of the surface referred to as "roughness". In profile, the roughness appears as peaks and valleys.

While the invention as claimed herein is not bound by any particular theory, it is believed that there is a tendency for caustic concentration gradients to form in stagnant areas in the deeper recesses of a rough surface, which cause the current efficiency to decrease.

On this smooth side of the membrane, the peaks and valleys of the roughness occur at intervals ranging up to about 100 microns (4000 microinches).

The second surface of the membrane, which faces the anode, generally has a roughness which does not exceed 15 microns (600 microinches), and which is preferably in the range of 1.3 to 13 microns (50 to 500 microinches). When the membrane consists only of one or more layers of polymer with carboxylic functionality, the second surface will obviously be of that type of polymer. When the membrane consists of a layer of polymer having carboxylic functionality and a layer of polymer having sulfonyl functionality, the second surface will be the exposed surface of the layer having sulfonyl functionality. In either case, the membrane may or may not have a web of support material incorporated therein.

The roughness characteristics as specified herein of the first surface, which faces toward the cathode, is the more important in achieving operation at high current efficiency, as will be seen in the examples below.

In a preferred embodiment of the process and cell of the invention, the membrane consists of three layers of polymer and a fabric of perhalocarbon threads. The first layer is of fluorinated polymer having carboxylic functionality, the second layer is between the first and third layers and is of fluorinated polymer having sulfonyl functionality, and the third layer is also of fluorinated polymer having sulfonyl functionality. The fabric is embedded at least predominantly in the second and third layers. The roughness and preferred roughness of the surfaces is as specified above.

The membrane can be made from the component layers of film and the web of support material with the aid of heat and pressure. Temperatures of about 200° C. to 300° C. are ordinarily required to fuse the polymer films employed and enable the web of support material to become completely embedded in the film, and, when two films are used, to make the films fuse together; the temperature required may be even above or below this range, however, and will depend on the specific polymer or polymers used. The choice of a suitable temperature in any specific case will be clear, inasmuch as too low a temperature will fail to effect an adequate degree of adherence of films and fabric to each other, and too high a temperature will cause leaks to form. Pressures or as little as about $2 \times 10^4$ pascals, to pressures exceeding $10^7$ pascals can be used. A hydraulic press is a suitable apparatus for making the membrane, in which case typical pressures are in the range of $2 \times 10^5$ to $10^7$ pascals.

Another apparatus, suitable for continuous preparation of membrane, comprises a hollow roll with an internal heater and an internal vacuum source. The hollow roll contains a series of circumferential slots on its surface which allow the internal vacuum source to draw component materials in the direction of the hollow roll. The vacuum draws the component materials of the membrane onto the hollow roll, such that typical air pressures against the component materials is in the range of $5 \times 10^4$ to $10^5$ pascals. A curved stationary plate with a radiant heater faces the top surface of the hollow roll with a spacing of about 6 mm (¼ inch) between their two surfaces.

During a lamination run, porous release paper is used in contacting the hollow roll as a support material to prevent adherence of any component material to the roll surface and to allow vacuum to pull component materials in the direction of the hollow roll. Feed and takeoff means are provided for the component materials and product. In the feed means one idler roll of smaller diameter than the hollow roll is provided for release paper and component materials. The feed and takeoff means are positioned to allow component materials to pass around the hollow roll over a length of about 5/6 of its circumference. A further idler roll is provided for the release paper allowing its separation from the other materials. Takeoff means are provided for the release paper and the product membrane.

For use in ion exchange applications and in cells, for example a chloroalkali cell for electrolysis of brine, the membrane should have all of the functional groups converted to ionizable functional groups. These groups can be —COOM groups, and, when present, —SO$_3$M groups, where M is Na or K. Such conversion is ordinarily and conveniently accomplished by hydrolysis with acid or base, such that the various functional groups described above in relation to the melt-fabricable polymers are converted respectively to the free acids or the alkali metal salts thereof. Such hydrolysis can be carried out with an aqueous solution of a mineral acid or an alkali metal hydroxide. Base hydrolysis is preferred as it is faster and more complete. Use of hot solutions, such as near the boiling point of the solution, is preferred for rapid hydrolysis. The time required for hydrolysis increases with the thickness of the structure. It is also of advantage to include a water-miscible organic compound such as dimethylsulfoxide in the hydrolysis bath. The free carboxylic and sulfonic acids are convertible to salts with NaOH or KOH.

The membrane of the invention is impermeable to hydraulic flow of liquid at the typical low pressures which occur during operation of a chloralkali cell. (A diaphragm, which is porous, permits hydraulic flow of liquid therethrough with no change in composition, while an ion exchange membrane permits selective permeation by ions and permeation of liquid by diffusion, such that the material which penetrates the membrane differs in composition from the liquid in contact with the membrane.) It is an easy matter to determine whether there is or is not hydraulic flow of liquid by a leak test with gas or liquid.

A principal use of the ion exchange membrane of the invention is in electrochemical cells. Such a cell comprises an anode, a compartment for the anode, a cathode, a compartment for the cathode, and a membrane which is situated to separate the two said compartments. One example is a chloralkali cell.

The copolymers used in the layers described herein should be of high enough molecular weight to produce films which are at least moderately strong in both the melt-fabricable precursor form and in the hydrolyzed ion exchange form.

To further illustrate the innovative aspects of the present invention, the following examples are provided.

Surface roughness measurements were made on membranes described herein with two different apparatuses, a Brush Surfanalyzer, and a Brush Surfindicator (both now supplied by Federal Products Corporation).

The Brush Surfanalyzer (Model 150) is a device which moves a stylus across the surface of a sample. The stylus moves up and down depending on the profile of the surface. This up and down movement is transformed into an electrical signal which is fed to a recorder. The recorder, therefore, traces the profile of the surface traversed by the stylus. A diamond stylus was used having a radius of 0.0005 inches (13 microns) and it was driven at a transverse speed of 0.01 in/sec (254 microns/sec). Controls were set to give 500 microinches for each vertical division on the recorder chart, and 2000 microinches (51 microns) for each horizontal division with the switch in profile mode (Mode A). By utilizing the roughness mode (Mode B, switch set at roughness) the large amplitude, low frequency undulations were eliminated and only the smaller amplitude, higher frequency roughness is recorded. The cut-off switch was set at 0.030 inches (762 microns) so that everything with a wave length of up to 762 microns is included in the roughness.

The Brush Surfindicator Model BL-110 is a similar machine except the electrical output from the stylus is fed to a meter calibrated in microinches. Stylus travel was $\frac{1}{8}$ inch (3175 microns). An average roughness is measured on the meter.

EXAMPLES

Example 1

A sample of fabric-reinforced ion-exchange membrane was prepared as follows. Two 50-micron (2-mil) thick films of the copolymer of tetrafluoroethylene and methyl perfluoro(4,7-dioxa-5-methyl-8-nonenoate) having an ion-exchange capacity of 0.925 meq/gm (an equivalent weight of 1080) were laminated around a reinforcing fabric by placing the fabric between the films. Lamination was accomplished by heating the sandwich of films and fabric and applying vacuum from the bottom of the laminate through a porous paper using lamination equipment described hereinabove. The bottom surface of the laminate was in contact with the porous paper while the top side was in contact with air. The top film and the fabric were wider than the bottom film so that the air in the fabric between the films was evacuated and the resulting two films were melted around and through the fabric. The fabric had 15 200-denier threads/inch of polytetrafluoroethylene in each direction and there were four 50-denier threads of rayon between two consecutive polytetrafluoroethylene threads in each direction. The imprint of the paper surface thus was pressed into the bottom surface of the laminate while the top surface was smooth due to the melting of the polymer but maintained the contour of the cloth and followed the contour of the top of the fabric. The sample was hydrolyzed to the —COOK form of the polymer in a mixture of dimethyl sulfoxide, potassium hydroxide and water at 90° C. for 30 minutes.

Pieces of this membrane were mounted in each of two small chloroalkali cells. In cell A the rough surface made by the imprint of the paper faced the cathode and in cell B the smooth melted surface faced the cathode. The cells were operated at 80° C., 3.1 KA/$m^2$ current density, producing 32% caustic. Inlet brine concentration was 300 g/l and exit brine was 216 g/l. Table I illustrates performance for the two cells.

TABLE I

| Side Facing Cathode | Days | CELL PERFORMANCE Current Efficiency | Volts | Power Consumption |
|---|---|---|---|---|
| Cell A | | | | |
| Rough (Paper) | 1 | 89.9 | 3.76 | 2794 |
|  | 3 | 87.8 | 3.89 | 2960 |
|  | 7 | 72.6 | 3.92 | 3667 |
| Membrane removed, turned around and reinstalled. | | | | |
| Smooth | 1 | 94.3 | 3.77 | 2670 |
|  | 5 | 96.4 | 3.76 | 2605 |
|  | 8 | 95.6 | 3.79 | 2648 |
| Cell B | | | | |
| Smooth | 3 | 97.8 | 3.63 | 2479 |
|  | 5 | 95.5 | 3.79 | 2644 |
|  | 6 | 96.3 | 3.87 | 2684 |
| Membrane removed, turned around and reinstalled. | | | | |
| Rough (Paper) | 3 | 90.4 | 3.78 | 2793 |
|  | 5 | 90.4 | 3.79 | 2800 |
|  | 7 | 91 | 3.77 | 2767 |
|  | 10 | 90.6 | 3.80 | 2801 |
| Membrane removed, turned around and reinstalled. | | | | |
| Smooth | 1 | 92.3 | 3.80 | 2750 |
|  | 3 | 95.2 | 3.76 | 2638 |
|  | 6 | 96.0 | 3.75 | 2609 |
|  | 7 | 96.3 | 3.75 | 2601 |

The Surfanalyzer in Mode B showed the rough (paper) side of the laminate to have the paper pattern roughness superimposed on contours corresponding to the reinforcing thread, while the smooth (top) side showed only contours corresponding to the threads and no paper pattern roughness. It can be readily seen that the current efficiency is better, and the resultant power consumption is lower, when the smooth surface faces the cathode.

Example 2

A membrane was prepared as follows. Two 50-micron (2-mil) thick films of a copolymer of tetrafluoroethylene and methyl perfluoro (4,7-dioxo-5-methyl-8-nonenoate) having an equivalent weight of 1080 were laminated around a reinforcement fabric having monofilament threads of a copolymer of 96 wt. % tetrafluoromethylene and 4 wt. % perfluoro (propyl vinyl ether) (see U.S. Pat. No. 4,029,868, Comparison C) in a leno weave with 36 threads (200 denier) in the warp direction and 18 threads (200 denier) in the fill direction. Lamination involved heating the polymer and applying vacuum to the laminate and drawing the laminate down onto a porous paper as in Example 1. The bottom surface of the laminate therefore was embossed by the paper surface.

This membrane was hydrolyzed to the —COOK form in an aqueous solution containing 33 wt. % dimethyl sulfoxide and 13 wt. % potassium hydroxide for 30 minutes.

A piece of the resulting membrane was mounted in a small chloralkali cell with the top, smooth surface facing the catholyte. The cell was operated at 80° C., 3.1 KA/m², producing 32% caustic.

TABLE II

| | CELL PERFORMANCE | | |
|---|---|---|---|
| Side Facing Cathode | Days | Current Efficiency | Volts | Power Consumption |
| Smooth | 3 | 97.4 | 3.72 | 2558 |
| | 4 | 95.7 | 3.82 | 2666 |
| | 5 | 93.4 | 4.34 | 3103 |
| | 6 | 96.4 | 3.74 | 2592 |
| Membrane removed and reversed. | | | | |
| Rough·(Paper) | 3 | 91.3 | 4.36 | 3118 |
| | 4 | 91.4 | 4.38 | 3171 |
| | 5 | 92 | 4.32 | 3174 |
| | 6 | 93.7 | 4.44 | 3049 |
| | 7 | 91.4 | 4.33 | 3194 |
| | 10 | 91.4 | 4.38 | 3215 |

The above demonstrates the improved performance when the top, smooth surface of the membrane is mounted facing the cathode.

Example 3

A membrane was prepared as follows. A 50-micron (2 mil) thick film of the copolymer of tetrafluoroethylene and methyl perfluoro (4,7-dioxa-5-methyl-8-nonenoate) having an equivalent weight of 1080 (0.925 meq/g) ion-exchange capacity) and a 100-micron (4 mil) thick film of the copolymer of tetrafluoroethylene and perfluoro (3,6-dioxa-4-methyl-7-octene sulfonyl fluoride) having an equivalent weight of 1100 (0.909 meq/g ion-exchange capacity) were pressed together into non-adherent contact by passing them simultaneously between a pair of nip rolls. Each film was separately trained around the periphery of its respective nip-roll so that the films did not touch until the nip was reached, so as to achieve a rolling wedge effect which precludes any entrainment of air between the films, because any entrained air would lead to formation of bubbled, deformed areas during formation of the membrane as a result of expansion of air during heating. The resulting assembly of films was passed through the laminator described hereinabove in two different ways. (A) The assembly was placed on the release paper with the carboxyl-containing film up and the sulfonic-containing film down against the release paper, and (B) the assembly was placed on the release paper with the sulfonyl-containing film up and the carboxyl-containing film down against the release paper. In this manner, two separate membranes were made: "A"0 in which the carboxyl-containing polymer was smooth, and "B" in which the carboxyl-containing polymer has the pattern of the paper impregnated into its surface. Laminator vacuum roll temperature was 235° C. and horseshoe heater temperature was 270° C. Vacuum was 15 inches Hg below atmospheric (50.7 kilopascals absolute pressure), and linear speed was 1 ft/min. The membranes were hydrolyzed to the potassium salt form in a solution of dimethyl sulfoxide, potassium hydroxide and water.

The two membranes "A" and "B" were mounted in small laboratory chloroalkali cells. In one cell membrane "A" was mounted with the carboxyl-containing polymer facing the cathode. In the other cell membrane "B" was mounted, again with the carboxyl-containing polymer facing the cathode. Cells were operated at 80° C., 3.1 KA/m² current density, producing 32% caustic. Inlet brine concentration was 310 g/l and exit brine concentration was 216 g/l. The following table illustrates performance.

TABLE III

| | CELL PERFORMANCE | | | |
|---|---|---|---|---|
| Membrane | Days | Current Efficiency | Volts | Power Consumption |
| "A" | 1 | 96.4 | 3.61 | 2500 |
| | 4 | 96.3 | 3.55 | 2469 |
| | 5 | 96.7 | 3.57 | 2472 |
| | 6 | 96.2 | 3.56 | 2486 |
| "B" | 3 | 95.0 | 3.65 | 2588 |
| | 4 | 95.5 | 3.66 | 2560 |
| | 5 | 95.1 | 3.66 | 2571 |

The Surfindicator showed average roughness on the paper side to be 2 to 3 microns (80–120 microinches) compared to average roughness on the smooth side to be 0.3 to 1.1 microns (12–45 microinches).

The above demonstrates the higher current efficiency and lower power consumption were attained when the surface facing the cathode is smooth.

INDUSTRIAL APPLICABILITY

The method of the present invention is technically advanced over the prior art. It provides for improved performance in a chloroalkali cell, including operation at low voltage and high current efficiency, and thus at low power consumption. There is accordingly a substantial saving in operating costs resulting from the lowered consumption of power.

I claim:

1. A method for improving the current efficiency in the process for electrolysis of an alkali metal chloride in an electrolytic cell divided by a cation-exchange membrane into an anode compartment and a cathode compartment in which an alkali metal hydroxide is produced, said membrane comprising at least a first layer, said first layer being of a first fluorinated polymer having carboxylic functional groups in ion-exchange form and having an equivalent weight in the range of 1000 to 1100, said first layer having a first exposed surface which has a roughness in the range of 0.4 to 1.3 microns, said membrane having a second exposed surface which has a roughness in the range of 1.3 to 13 microns, provided that said first exposed surface is smoother than said second exposed surface, wherein said membrane is disposed so that said first exposed surface faces toward said cathode compartment.

2. The method of claim 1 wherein said fluorinated polymer is a perfluorinated polymer.

3. The method of claim 2 wherein said first layer has said second exposed surfaces and has a fabric of perhalocarbon threads embedded therein.

4. The method of claim 2 wherein said membrane further comprises a second layer, said second layer being in adherent contact with said first layer and being of a second perfluorinated polymer having sulfonyl functional groups in ion-exchange form.

5. The method of claim 4 wherein said membrane further comprises a web of support material embedded therein.

6. The method of claim 5 wherein said web is a fabric of perhalocarbon threads and is embedded predominantly in said second layer.

7. The method of claim 2 wherein said membrane further comprises second and third layers and a fabric of perhalocarbon threads, said second layer being of a second perfluorinated polymer having sulfonyl groups in ion-exchange form, said third layer being of a third perfluorinated polymer having sulfonyl groups in ion-exchange form, said second layer being positioned between and in adherent contact with said first and third layers, said third layer having said second exposed surface, and said fabric being embedded predominantly in said second and third layers.

8. The method of claim 3 wherein said first perfluorinated polymer has terminal

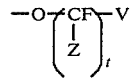

groups where Z is F, t is 1 to 12, and V is —COOR where R is lower alkyl, said —COOR having been hydrolyzed to —COOM where M is Na or K.

9. The method of claim 4 wherein said first perfluorinated polymer has terminal

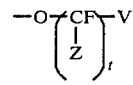

groups where Z is F, t is 1 to 12, and V is —COOR where R is lower alkyl, said —COOR having been hydrolyzed to —COOM where M is Na or K, and said second perfluorinated polymer has

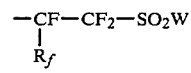

groups where $R_f$ is F and W is F, said $SO_2W$ having been hydrolyzed to —$SO_3M$ where M is Na or K.

10. The method of claim 7 wherein said first perfluorinated polymer has terminal

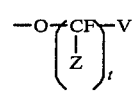

groups where Z is F, t is 1 to 12, and V is —COOR where R is lower alkyl, said —COOR having been hydrolyzed to —COOM where M is Na or K, and second and third perfluorinated polymers have

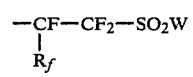

groups where Rf is F and W is F, said $SO_2W$ having been hydrolyzed to —$SO_3M$ where M is Na or K.

* * * * *